Nov. 28, 1939.   R. R. SMITH   2,181,497
ELECTRICAL APPARATUS
Filed Aug. 31, 1935   2 Sheets-Sheet 2
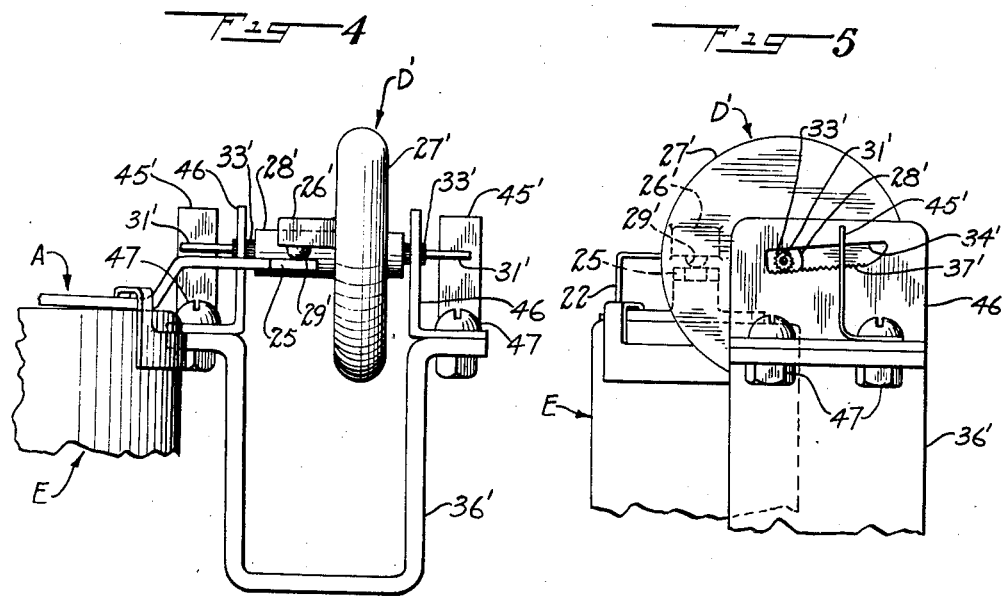
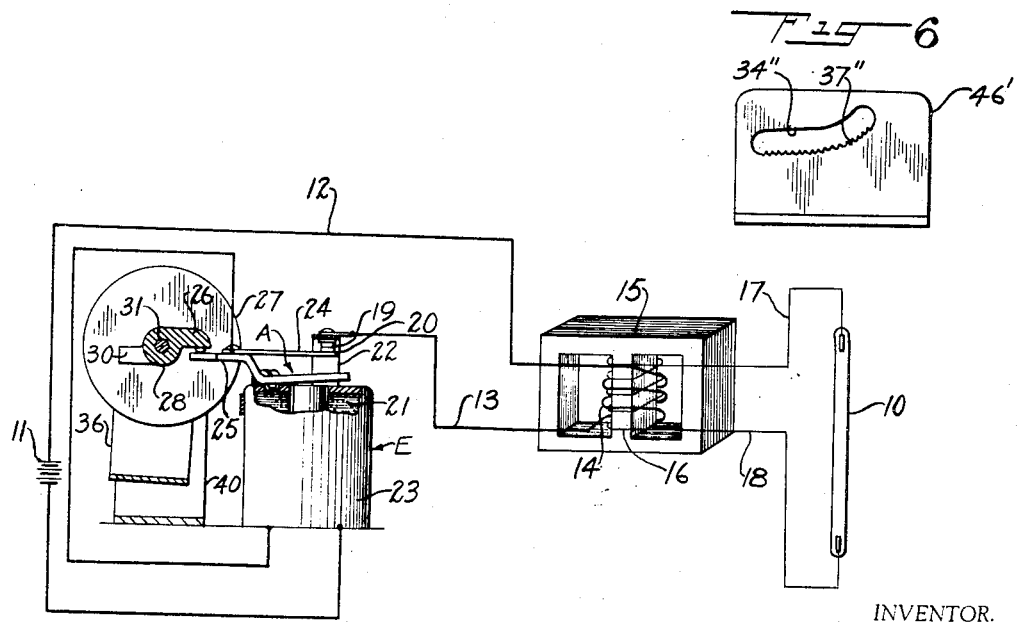
INVENTOR.
RALPH R. SMITH
BY
ATTORNEY.

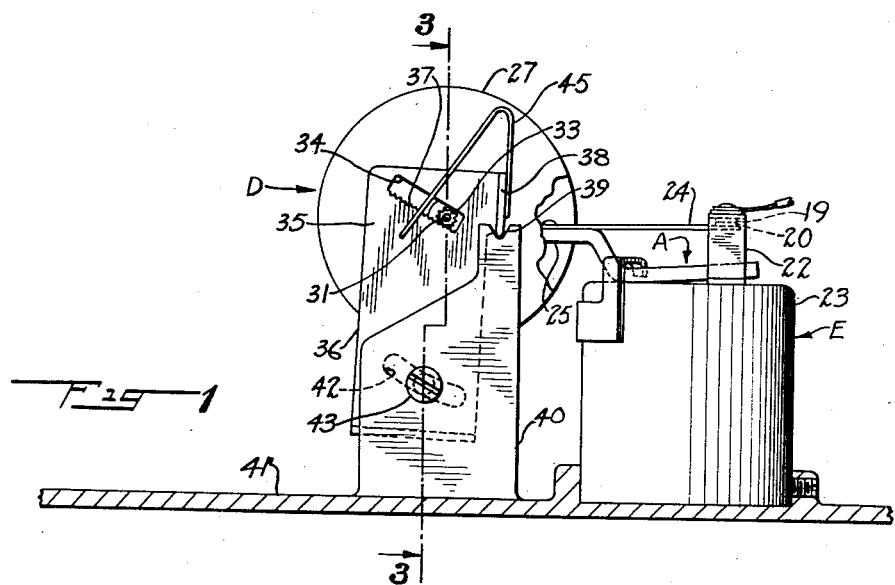

Patented Nov. 28, 1939

2,181,497

UNITED STATES PATENT OFFICE

2,181,497

ELECTRICAL APPARATUS

Ralph R. Smith, Cleveland, Ohio, assignor, by mesne assignments, to Union Carbide and Carbon Corporation, a corporation of New York Application August 31, 1935, Serial No. 38,709

22 Claims. (Cl. 200—90)

This invention relates to electric apparatus, and to electrical systems embodying such apparatus for controlling the manner in which current is supplied to an electrical device.

In many instances it is desirable to provide apparatus for periodically or intermittently energizing an electrical device, and this is particularly true where it is desired to produce warning signals. Such warning signals may be indicated by a lamp or luminous tube which is connected to a source of electrical energy, and the current may be supplied to the lamp in such a manner that a flashing light is produced.

In many cases apparatus of this character is employed where the usual source of power is not available, and hence small batteries or dry cells are utilized as the source of electrical energy. Such apparatus should be self-operating for long periods of time, and preferably should require periodic inspection merely for renewal of batteries or dry cells.

For mechanically controlling the manner in which current is periodically or intermittently supplied to an electrical device, it is generally the practice to employ an oscillatory member or balance wheel, and to impart successive thrusts or kicks to such balance wheel in any suitable manner, as by the armature of an electromagnetic motor. Each thrust imparted to the balance wheel causes the latter to rotate, means being provided to rotate the balance wheel in the opposite direction, after it comes to rest, so that the wheel returns to its initial position to receive successive thrusts or kicks. During each oscillation of the balance wheel the current may be supplied to the electrical device for an interval of time so that a flashing signal is produced. It has been the usual practice heretofore to support the shaft, upon which the balance wheel is mounted, in fixed bearings. This is objectionable because lubricating problems are encountered during below freezing temperatures when ordinary bearings are used, and the apparatus becomes relatively expensive when jeweled bearings are employed.

Further, mounting the balance wheel in fixed bearings necessitates the use of resilient means, such as a helical spring, to cause the balance wheel to reverse its direction of rotation after the armature of the electromagnet imparts a thrust or kick to it. With such an arrangement the amount of each oscillation and the frequency of oscillations of the balance wheel do not remain constant when small batteries or dry cells are used to energize the electromagnet. This is due to the fact that the tension of the helical spring remains substantially constant while the magnitude of the thrusts imparted to the balance wheel becomes smaller because of the gradual decrease of the voltage of the batteries or dry cells during their use. As the magnitude of the thrusts imparted to the balance wheel becomes smaller, the amount of each oscillation of the balance wheel decreases and the frequency of oscillations thereof increases. With an increase in the frequency of oscillations of the balance wheel, the amount of current consumed increases, further accelerating the rate at which batteries or dry cells are discharged or exhausted. Not only is the increased current consumption objectionable, but the frequency of operation varies appreciably during the useful life of the batteries.

The objects of the present invention are to provide automatically oscillatable apparatus which is reliable in operation; to provide such apparatus which is inexpensive and in which no lubricating problems are encountered; to provide a system whereby dry cells may be employed to supply current at a sufficiently high voltage to energize gas-filled tubes, such as tubes containing neon gas, to produce warning signals; to provide control apparatus which can be employed in lighting systems and operated for relatively long periods of time with dry cells; to provide control apparatus for intermittently supplying current in lighting systems at a relatively low frequency; and to provide control apparatus that maintains the frequency at which current is intermittently supplied to an electrical device between definite or narrow limits as the dry cells are being consumed and become exhausted.

This invention will be more fully set forth in the following description, reference being made to the accompanying drawings in which Fig. 1 illustrates apparatus embodying the present invention for controlling the manner in which current is intermittently supplied to an electrical circuit; Fig. 2 is an enlarged fragmentary view, partly in section, of the apparatus shown in Fig. 1; Fig. 3 is a sectional view taken at line 3—3 of Fig. 1; Fig. 4 illustrates an end view of a modification of the apparatus shown in Figs. 1 to 3; Fig. 5 is a fragmentary side view of the embodiment shown in Fig. 4; Fig. 6 illustrates a further modification of a portion of the apparatus shown in Figs. 1 and 5; and Fig. 7 diagrammatically illustrates an electrical system embodying the control apparatus, the particular electromagnetic interrupter being shown partly in section.

Referring to Fig. 7, an electrical system is illustrated for supplying current at a relatively high voltage to an electrical device 10. For giving warning signals the electrical device 10 may comprise a tube containing a gas, such as neon. A low voltage source 11 of direct current, such as a group of dry cells, may be employed as the source of electrical energy for supplying current intermittently to the gas-filled tube 10 to produce a flashing luminous signal. The dry cells 11 are connected through conductors 12 and 13 to a load circuit, such as the primary winding 14 of a transformer, having a core structure 15, and a secondary winding 16 thereon, connected through conductors 17 and 18 to the gas-filled tube 10.

In order to produce a pulsating current of high voltage in the secondary winding 16, the flux in the core structure 15 is changed by periodically closing and rapidly opening the circuit of the primary winding 14. For this purpose an interrupter or vibratory electromagnetic motor, of the type described in my application Serial No. 25,242, filed June 6, 1935, may be employed. The interrupter comprises a pair of cooperating contacts 19 and 20 which are connected in series relation with the primary winding 14, and these contacts are adapted to be separated intermittently by the energization of a coil 21 of an electromagnet E that is connected in series relation with contacts 19 and 20. The contact 19 is secured to and insulated from a U-shaped yoke 22 mounted on the shell 23 of the electromagnet E, and the contact 20 is secured to a leaf spring 24 that is carried by the off-set end 25 of an armature A pivotally mounted at the upper end of the shell 23 and adapted to be attracted by the electromagnet.

The inductances of the primary winding 14 of the transformer and coil 21 are so proportioned that the magnetic flux builds up in the core structure 15 to a definite value before the coil 21 is energized sufficiently to attract the armature A and open the contacts 19 and 20. This definite value of field flux is such that, when the circuit of the primary winding 14 is opened, the changes of flux linking the secondary winding 16 will produce the necessary high voltage in the latter winding to energize the gas-filled tube 10. Since the tube 10 is momentarily energized each time the contacts 19 and 20 are opened, after the flux builds up in the core structure 15, it is quite evident that the manner in which the tube 10 is energized can be controlled by the rate or frequency at which the primary winding circuit is closed and then subsequently opened by the electromagnet E.

In accordance with the present invention the primary winding circuit is intermittently closed by a rotatable or oscillatory member D provided with a lug or abutment pin 26 which is adapted to engage the off-set end 25 of the armature A and move the latter to close the contacts 19 and 20. Referring to Fig. 3 the member D may comprise a pair of spaced circular plates 27 having a connecting hub 28 formed integrally therewith. The lug or abutment pin 26 adapted to engage the offset end 25 of the armature A extends radially outward from the hub and is provided with a recess to receive a hardened steel ball 29, so that the thrusts or kicks can be effectively imparted by the armature A to the member D.

In order to counter-balance the weight of the lug 26 so that the member D is substantially a balanced wheel, the plates 27 are provided with raised portions 30 at their inside surfaces which extend radially outward from the hub 28 in a direction opposite to that of the lug 26, as shown in Fig. 2. The member D is provided with a shaft 31 which extends through an opening in the plates 27 and hub 28, and the hub is provided with a threaded opening to receive a set screw 32 to prevent relative axial movement of this shaft.

The member D is supported in such a manner that it is rotatable and also translatable along an inclined path between two points at different elevations. In the preferred embodiment shown this is accomplished by fixedly securing pinions 33 to the shaft 31 adjacent to the outside surfaces of the plates 27. The outer ends of the shaft 31 extend through elongated openings 34 in the upwardly extending side walls 35 of a U-shaped bracket 36, and the lower edges of these openings are provided with teeth to form racks 37 adapted to be engaged by the pinions 33, as shown in Fig. 1. When a thrust is imparted to the lug 26 by the armature A, the member D will roll upwardly along the racks until a state of equilibrium is reached. After reaching this high point in its path of movement, the force of gravity is then effective to roll the member D in the opposite direction and move it down the racks until the lug 26 engages the off-set end 25 of the armature A. Stated another way, potential energy is being stored in the member D as it ascends toward the high point in its path of movement and, after it comes to rest, this energy is effective to rotate and translate the member toward the low point in its path of movement so that a part thereof will engage and move the armature A. The movement of the armature A completes the circuit of the coil 21 and the primary winding 14, thereby energizing the electromagnet E to actuate the armature and impart another thrust to the member D.

In order to vary the rate or frequency at which the member D is operative to close the contacts 19 and 20, the U-shaped bracket 36 is preferably supported in such a manner that the angle of inclination of the racks 37 to the horizontal plane can be adjusted. As shown, the side walls 35 of the bracket 36 are each provided with an outwardly extending flange 38 adjacent the upper portions of these walls. The lower edges of flanges 38 are pivotally supported in notches 39 formed at the upper edges of vertical supporting plates 40 which are formed integrally with the base plate 41. These supporting plates are so spaced that the U-shaped bracket 36 fits snugly between them, as shown in Fig. 3, and one of the supporting plates 40 is provided with an elongated opening 42 through which extends a threaded stud 43 that also extends through a small opening in a side wall of the bracket 36 and has a nut 44 secured thereto. By loosening the nut 44 the U-shaped bracket 36 can be angularly moved about the pivotal supports at 39 to incline the racks 37 at any desired angle with respect to the horizontal plane. In this manner the length of time the member D takes to ascend and descend along the inclined racks 37 can be controlled to vary the rate or frequency at which the circuit of the primary winding 14 is closed.

As the dry cells become exhausted during continuous operation of the apparatus, the magnitude of the thrusts imparted by the armature A gradually decreases so that the amount of oscillation or rotation and the distance of movement of the member D along the inclined racks 37 becomes smaller. With lower battery voltages, therefore, the frequency at which the circuit of the primary winding 14 is closed ordinarily becomes greater. To compensate for this effect, means is provided to maintain the frequency or rate of circuit closing between definite limits irrespective of the voltage of the source of electrical energy. Such means may comprise a pair of flat resilient springs 45 of V-shaped form each having one arm thereof secured to the flanges 38. The opposite arms of these springs 45 extend obliquely downward in the region of the elongated openings 34, and the ends of these arms are disposed in the path of movement of the ends of the shaft 31. The leaf springs 45 are so positioned that, when the dry cells are new and the voltage is high, a thrust of such magnitude is imparted to the member D that the free arms of the springs 45 are flexed as the member ascends up the inclined racks 37. The flexing of the springs 45 tends to decrease the distance that the member D would normally ascend up the racks 37, and the energy stored in the flexed springs is effective to assist the force of gravity in causing the member D to move down the racks so as to receive another thrust or kick from the off-set end 25 of the armature A.

As the voltage of the dry cells decreases, the magnitude of the thrust imparted to the member D becomes less so that the distance the member D rotates and moves along the inclined racks decreases. Thus the springs 45 are not flexed to the same extent as when the voltage of the dry cells is high, and the effect of the springs to stop the movement of the member is less pronounced. Further, less energy is stored in the flexed spring to assist the force of gravity to effect the downward movement of the member D.

It will be noted that in Fig. 1 the free arms of the leaf springs 45 are in such a position that the member D must move a short distance before the springs 45 are effective to counteract the upward movement of the member. It will thus be apparent that when the voltage of the dry cells is very low, the thrust imparted to the member D may be of such magnitude that the springs 45 do not come into play and that the high point of travel of the member falls short of the position of the free arms of the leaf springs 45. By providing the leaf springs 45 in the manner just described, it has been possible to maintain the frequency of oscillations of the member D between narrow limits during the entire useful life of batteries or dry cells, which limits have been found entirely satisfactory for all ordinary operating requirements. Although the springs 45 are so positioned that their free arms do not come into play until the member D moves upward a predetermined distance along the racks 37, it should be apparent that leaf springs of such resiliency may be employed that substantially the same result is obtained when the leaf springs are bearing at all times against the ends of the shaft 31.

Figs. 4 and 5 illustrate a modification of the embodiment shown in Figs. 1 to 3, in which the member D' and armature A are disposed at right angles to each other instead of being in alignment as in the embodiment just described. In Figs. 4 and 5 the member D' comprises a wheel 27' having a hub 28' formed integrally therewith. A shaft 31' extends through an opening in the hub 28' and is secured thereto to prevent relative axial movement, and a pinion 33' is mounted on each end of the shaft adjacent the hub 28'. The ends of the shaft 31' extend through elongated openings 34' formed in the spaced side walls of angle brackets 46, the lower edges of which openings form inclined racks 37' along which the pinions 33' are adapted to travel. The short horizontal arms of the brackets 46 are secured at 47 to the flanges at the upper ends of a U-shaped bracket 36', which may be supported in the same manner as the bracket 36 in the previous embodiment, for varying the angle of inclination of the racks 37'.

Adjacent the outer periphery of the wheel 27' is provided a lug 26' which is substantially parallel to the hub 28'. This lug is also recessed to receive a hardened steel ball 29' which is adapted to engage and move the off-set end 25 of the armature A disposed at right angles to the wheel 27'. Instead of providing V-shaped leaf springs 45 to maintain the frequency of oscillation of the wheel 27' between narrow limits as the voltage of the batteries or dry cells decreases, as in the previous embodiment, substantially vertical leaf springs 45' are secured at 47 to the angle brackets 46. These leaf springs 45' are adjacent the openings 34' and in the path of movement of the ends of the shaft 31', and function in the same manner as the V-shaped springs 45 to maintain the frequency of oscillation of the member D' between narrow limits irrespective of the voltage of the source of electrical energy.

Although straight racks inclined to the horizontal have been illustrated in Figs. 1 and 5, it may be desirable in some instances to provide curved racks in which the angle of inclination increases, as shown in Fig. 6. Such a curved rack 37'' may be formed at the lower edge of an elongated opening 34'' in an angle bracket 46' which can be substituted for the angle bracket 46 shown in Figs. 4 and 5. When curved racks are employed it is possible to eliminate the use of leaf springs to maintain the frequency of oscillations of the member D between narrow limits. This may be accomplished by providing racks having such a curvature that the frequency of oscillations of the member D remains substantially constant irrespective of variations in the magnitude of the thrusts or kicks imparted to the member D.

In a particular electrical system employed to intermittently illuminate a tube 7 millimeters in diameter and 18 inches in length, and containing neon gas under 8 millimeters pressure of mercury, six 1.5 volt dry cells connected in series relation are employed as the low voltage source of direct current in a system similar to that shown in Fig. 7. In this arrangement the electromagnet E is provided with a coil having about 475 turns of number 20 wire, the maximum gap between the contacts 19 and 20 being approximately .010 inch.

In order to obtain a high rate of change of flux, the transformer is of the single-phase shell type having the windings 14 and 16 arranged about the middle leg of a three-legged core structure, as shown in Fig. 7. The core structure is preferably laminated and formed of stampings of double-annealed steel with alternate laminations overlapping each other. Thus a closed magnetic circuit of exceptionally soft steel is obtained, the permeability of such circuit being high, with the core losses, such as hysteresis and eddy current losses, at a minimum value. The step-up ratio of the transformer used is about 16:36:1, the primary winding having about 550 turns of number 24 wire and the secondary winding having about 9000 turns of number 38 wire.

To operate neon gas-filled tubes of the type specified above, the voltage usually required is about 500 volts per electrode and about 500 volts per foot of tubing. For the particular size tube used, therefore, 1750 volts would ordinarily be required for satisfactory operation from an alternating current source of supply.

The present lighting system produces a voltage in the secondary winding 16 which is capable of energizing the neon gas-filled tube. When the voltage of the dry cells is about 9 volts and control apparatus of the character shown in Figs. 1 to 3 is employed in the example being given, it has been observed with the cathode ray oscillograph that a secondary voltage of about 13,500 volts is produced to initially ionize the gas, and that the voltage decreases rapidly. A voltage wave taken from an oscillograph curve shows that the circuit is always opened while the current is increasing and the flux field is building up in the core structure 15. This indicates that the circuit is opened along the steep portion of and below the knee of the saturation curve of the transformer. When the voltage of the dry cells is about 9 volts, a frequency of about 78 flashes per minute is produced with the average intensity of illumination of the specified neon tube registering about 2 foot-candles on a Weston illuminometer. At this frequency the oscillatory member rotates about 350°.

When the voltage of the dry cells is about 4.5 volts, a secondary voltage of about 9,000 volts is produced to initially ionize the gas. At this lower value of battery voltage the frequency of flashes is slightly greater than at the higher value of voltage, being about 84 flashes per minute, the intensity of illumination being about 1.9 foot-candles.

It will be noted that in the example given that the frequency of flashes from 9 to 4.5 volts is maintained between the narrow limits of 78 and 84 per minute, with the intensity of illumination substantially constant. By maintaining this frequency low an adequate warning signal is produced and at the same time the amount of current consumed is maintained at a low value.

Instead of utilizing the present control apparatus to control the manner of supplying current through a transformer to a luminous tube, it can be effectively employed to control the current supplied directly from the source of supply to any electrical loading device, such as a lamp, etc., or the wires 12 and 13 may be joined, the device then operating independently to interrupt the current in the coil 21.

Although the coil 21, contacts 19 and 20, and primary winding 14 are connected in series relation in the embodiment shown in Fig. 7, it may be desirable in some cases to connect the coil 21 of the electromagnetic interrupter in parallel relation with the primary winding 14 or other loading device, the contacts 19 and 20 being in series with the battery and with the coil 21.

Although several embodiments have been illustrated and described, it will be apparent that modifications may be made without departing from the spirit and scope of the invention.

What is claimed is:

1. Apparatus comprising the combination of a rotatable member, means for supporting said member so that it is rotatable and also translatable along a path extending between two points at different elevations, thrust-imparting means disposed adjacent the lower point of the path of movement of said member adapted to be engaged by a part of said member and operative to impart a thrust thereto for rotating and translating it upward along said path toward the higher point thereof, and resilient means assisting the force of gravity being effective, after said member comes to rest, for rotating said member in the opposite direction and translating it along said path toward the lower point thereof to receive another thrust from said thrust-imparting means.

2. An electric circuit, and means for controlling said circuit comprising the combination of a rotatable member, means for supporting said member so that it is rotatable and also translatable along a path extending between two points at different elevations, a pair of contacts, a movable armature element disposed adjacent the lower point of the path of movement of said member and adapted to be engaged and moved by a part of said member, said circuit being closed by said contacts when said member engages and moves said armature element, and an electromagnet in said circuit adapted, when energized, to actuate said armature element and thereby impart a thrust to said member for rotating and translating it along said path toward the higher point thereof, at least the force of gravity being effective, after said member comes to rest, for rotating said member in the opposite direction and translating it along said path toward the lower point thereof to engage and move said armature element again.

3. An electric circuit, and means for intermittently closing and opening said circuit, said closing and opening means comprising an oscillatory member, means for supporting said member so that it can be oscillated and also translated along a path extending between two points at different elevations, a pair of contacts, a movable armature element disposed adjacent the lower point of the path of movement of said member and adapted to be engaged and moved by a part of said member, said circuit being closed by said contacts when said member engages and moves said armature element, an electromagnet in said circuit adapted, when energized, to actuate said armature element and thereby impart a thrust to said member for oscillating and translating it along said path toward the higher point thereof, at least the force of gravity being effective, after said member comes to rest, for oscillating said member in the opposite direction and translating it along said path toward the lower point thereof to engage and move said armature element again, and means cooperating with said member tending to maintain the frequency of oscillations of said member between definite limits irrespective of the voltage applied to said circuit.

4. An electric circuit including a pair of cooperating main contacts, and means for intermittently closing and opening said main contacts to control said circuit, such control means comprising a member adapted to be rotated and translated along a predetermined path, a movable armature element disposed in the path of movement of said member and adapted to be engaged and moved by a part of said member, an auxiliary circuit, auxiliary contacts in said auxiliary circuit; said auxiliary contacts and auxiliary circuit being closed when said member engages and moves said armature element, an electromagnet in said auxiliary circuit adapted, when energized, to actuate said armature element to open said main contacts and said auxiliary contacts and at the same time impart a thrust to said member for rotating and translating it along said path, at least the force of gravity being effective, after said member comes to rest, for rotating said member in the opposite direction and translating it along said path to engage and move said armature element again.

5. In a control apparatus the combination comprising an oscillatory member, a pair of spaced pinions carried by said member, a pair of inclined racks arranged in spaced relation for supporting said member, said pinions being adapted to engage and travel along said racks, and means adapted to be engaged by a part of said member and operative to impart a thrust to said member for rolling said member upwardly along said racks, at least the force of gravity being effective, when said member comes to rest, for rolling said member in the opposite direction downwardly along said racks to receive another thrust from said means.

6. Control apparatus as defined in claim 5, including resilient means disposed in the path of said member tending to limit the upward translation thereof along said racks.

7. An electric circuit, and means for intermittently closing and opening said circuit, said closing and opening means comprising the combination of an oscillatory member, a pair of spaced pinions carried by said member, means including a pair of racks arranged in spaced relation for supporting said member, said pinions being adapted to engage and travel along said racks, a movable armature element adapted to be engaged and moved by a part of said member, a pair of contacts operative by said armature, said circuit being closed by said contacts when said member engages and moves said armature element, and an electromagnet in said circuit adapted, when energized, to actuate said armature element and thereby impart a thrust to said member for oscillating and translating it upwardly along said racks, at least the force of gravity being effective, when said member comes to rest, for oscillating said member in the opposite direction and translating it downwardly along said racks to engage and move said armature element again.

8. The combination defined in claim 7, including means disposed in the path of movement of said member tending to limit the upward movement of said member along said racks.

9. The combination defined in claim 5, in which said spaced racks have such a curvature that the frequency of oscillations is maintained between definite limits irrespective of the magnitude of the thrusts imparted to said member.

10. The combination defined in claim 7, including means for varying the angle of inclination of said racks.

11. Electrical apparatus comprising the combination of a rotatable member, means for supporting said member for rotational and translational movement along an inclined path, and electrically energizable means operative by said member as it approaches the lower end of said inclined path to impart a thrust to said member for rotating and translating said member upwardly along said inclined path.

12. Electrical apparatus comprising the combination of a rotatable member, means for supporting said member for rolling movement along an inclined path, electromagnetic means operable by said member as it approaches the lower end of said inclined path to impart a thrust to said member for rolling said member upwardly along said inclined path.

13. Electrical apparatus as defined in claim 11 including resilient means flexible by said member in its upward motion along said inclined path and operative after said member has come to rest to assist the force of gravity in moving said member downwardly along said inclined path.

14. Electrical apparatus comprising the combination of a rotatable member, means for supporting said member for rotational and translational movement along a predetermined path, an electromagnet, a movable armature secured in operative relation to said electromagnet and being mounted adjacent to a first end of the path, and contact means operative by the movement of said member when approaching the first end of the path for energizing said electromagnet, thereby causing said armature to impart a thrust to said member for rotating and translating said member toward the second end of the path, said member being constrained, after coming to rest, to return to the first end of the path.

15. Electrical apparatus as defined in claim 14 wherein said contact means is operative by the thrusting movement of said armature to deenergize said electromagnet, said electromagnet thereby remaining deenergized until said member returns to the first end of the path.

16. The combination of a rotatable member mounted for rotational and translational movement along a predetermined path, and means for imparting a thrust to said member at one end of the path, said member comprising a pair of plates, a hub for mounting said plates in spaced relation, and a post extending generally radially from said hub for receiving the thrust.

17. Electrical apparatus comprising the combination of a rotatable member, means for supporting said member for rotational and translational movement along a predetermined path, an electromagnet, a movable armature secured in operative relation to said electromagnet and being mounted adjacent to a first end of said path, contact means operable by the movement of said member when approaching the first end of said path for energizing said electromagnet thereby causing said armature to impart a thrust to said member for rotating and translating said member toward the second end of said path, and resilient means engageable by said member at the second end of said path for applying a force to said member acting to return said member to the first end of said path, 18. Electrical apparatus comprising the combination of a rotatable member, means for supporting said member for rotational and translational movement along an inclined path, an electromagnet, a movable armature secured in operative relation to said electromagnet and being mounted adjacent to the lower end of said path, and contact means operable by the movement of said member when approaching the lower end of said path for energizing said electromagnet thereby causing said armature to impart a thrust to said member for rotating and translating said member upward toward the opposite end of said path.

19. In an electrical apparatus, the combination comprising a rotatable member, means for supporting said member for rotational and translational movement along a predetermined path, means operable by said member as said member approaches a first end of said path for imparting a thrust to said member for rotating and translating said member toward the opposite end of said path, and means operable when said member comes to rest for returning said member to said first end of said path.

20. In a control apparatus including a normally open electrical circuit, a member supported for rotational and translational movement, and contact means operable by said member for intermittently closing said electrical circuit; the combination with said member of oppositely disposed supporting pinions, and racks cooperative with said pinions for supporting said member for rotational and translational movement.

21. In a control apparatus having a normally open electrical circuit, a member supported for rotational and translational movement along a predetermined path, and contact means operable by said member for intermittently closing said electrical circuit; the combination with said member of rack and pinion supporting means for maintaining said member in positive predetermined relation to said path during such rotational and translational movement.

22. In a control apparatus having a normally open electrical circuit, a member supported for rotational and translational movement along a predetermined path, and contact means operable by said member for intermittently closing said electrical circuit; the combination with said member of thrust-imparting means operable when said circuit is closed to rotate and translate said member along said path, a projection extending from said member for receiving said thrust, and means for maintaining constant the relative position between said projection and said thrust-imparting means when said member is in position to receive a thrust, comprising a pinion secured to said member, and a rack forming part of said path and positively engaged by said pinion.

RALPH R. SMITH.